Oct. 25, 1966 — O. HEIL — 3,281,174
ART OF SEALING QUARTZ TO METAL
Original Filed Feb. 18, 1959 — 3 Sheets-Sheet 1
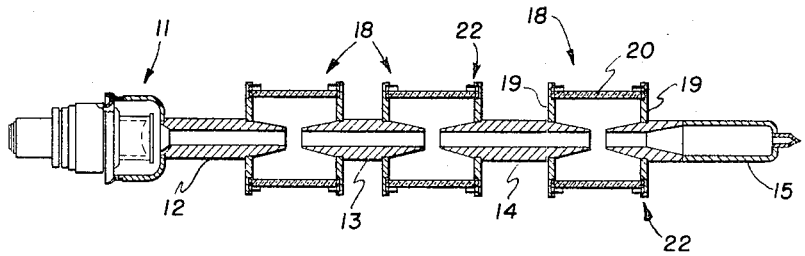
Fig. 1
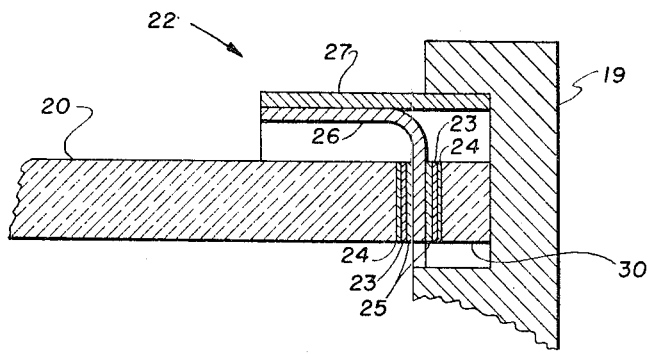
Fig. 2
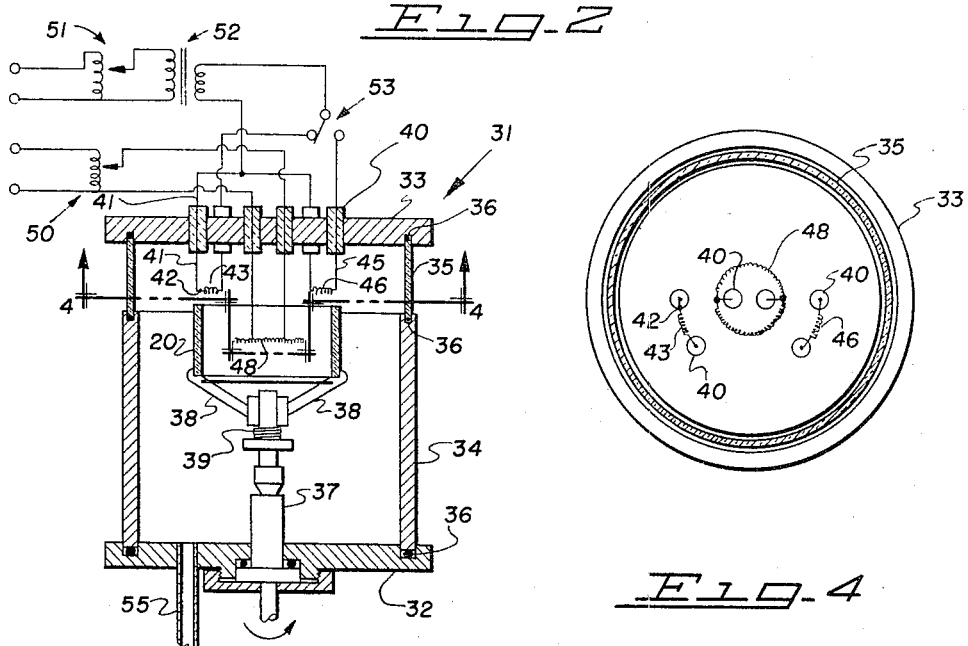
Fig. 3
Fig. 4
INVENTOR.
OSKAR HEIL
BY Leon F. Herbert
Robert W. Dilts
ATTORNEYS

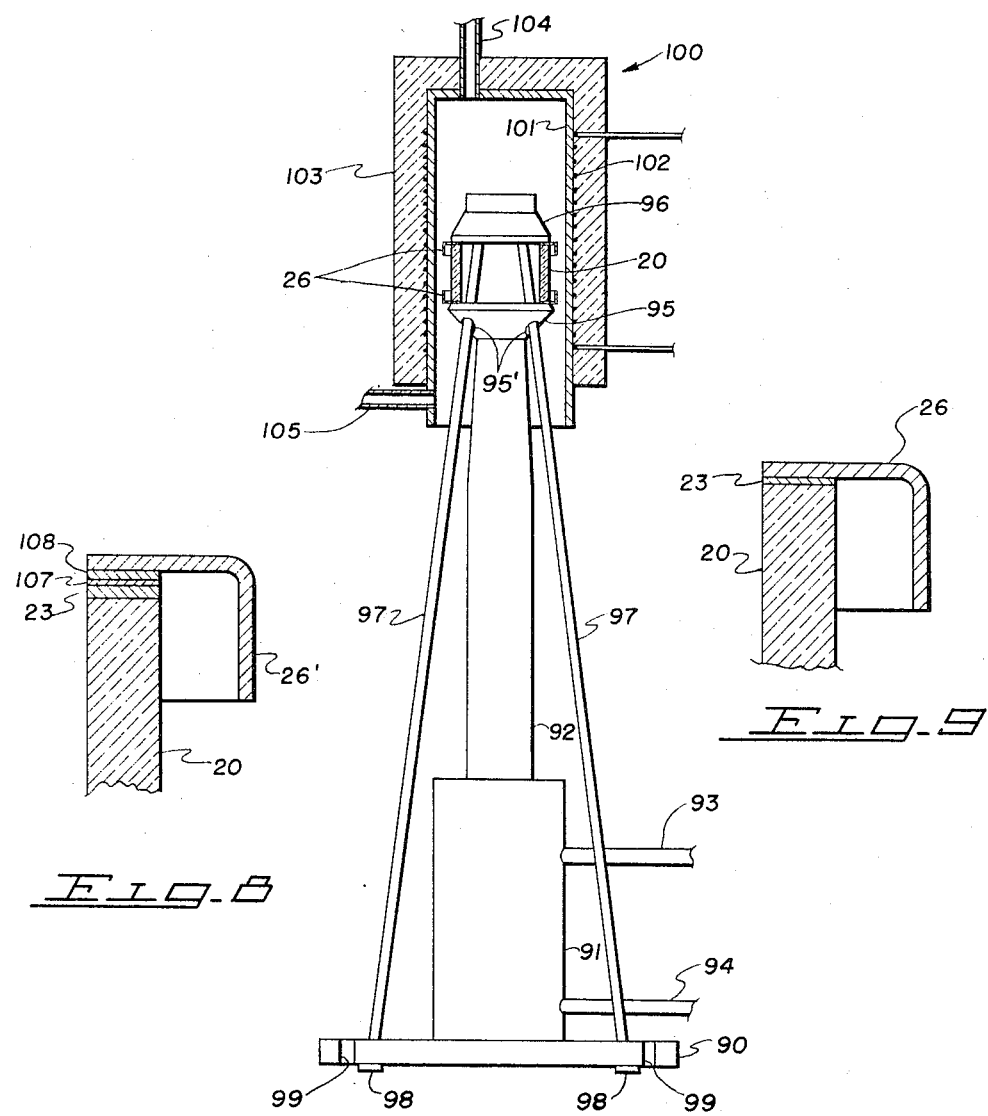

3,281,174
ART OF SEALING QUARTZ TO METAL
Oskar Heil, San Mateo, Calif., assignor, by mesne assignments, to Varian Associates, a corporation of California
Original application Feb. 18, 1959, Ser. No. 793,993, now Patent No. 3,115,957, dated Dec. 31, 1963. Divided and this application Oct. 29, 1963, Ser. No. 319,819
9 Claims. (Cl. 287—189.365)

This application is a division of my application Serial No. 793,993, filed February 18, 1959. This invention relates to a seal structure and method by which quartz can be joined to a metal member by a bond which is both vacuum-tight and physically strong. As used herein throughout the description and claims, the term "quartz" means quartz in the vitreous, or non-crystalline state, often referred to as pure silica glass or fused quartz.

Quartz is a very low loss dielectric with low dielectric constant and is therefore a very desirable substance for windows in high frequency electronic tubes such as klystrons and linear accelerators. Quartz also has very high transparency for infrared and ultra-violet radiation, which makes it an excellent window for photo cells, lamps, and similar devices in this freqeuncy range. Some other outstanding properties of quartz are its extremely low thermal expansion coefficient, which results in great thermal shock stability; its ability to withstand electron bombardment and exposure to X-rays and other atomic radiation without receiving any appreciable radiation damage; and its ability to withstand exposure to very high electric field strengths before breakdown occurs.

In the past, only limited use has been made of quartz for the purposes described, even though its desirable characteristics have been well known. The reason is that heretofore there has been no practical means for making a strong vacuum-tight seal between quartz and the metal parts of electronic tubes and other devices in which it is useful.

In recent years great strides have been taken in the art of making seals between ceramic and metal, and ceramic is now used extensively as a replacement for glass in electronic tubes. The problem of making a quartz-to-metal seal is much more severe than the problem of making a ceramic-to-metal seal. The first difficulty results from the fact that quartz cannot withstand the high temperatures to which ceramic is subjected for substantial time during metalizing. As a matter of fact, quartz cannot be subjected to much over 1000° C. for any appreciable length of time although it can withstand higher temperatures for very short periods. The effect of heating quartz over 1000° C. for appreciable time is that recrystallization of the quartz takes place, resulting in internal stresses which cause the quartz to crack. Accordingly, quartz cannot be metalized by the same techniques which are used in metalizing ceramic. In the case of ceramic the metalizing is accomplished by painting or otherwise coating the ceramic with a mixture of powdered metal particles suspended in a suitable lacquer, and then sintering the coating at temperatures of around 1400° C. for periods of around thirty minutes. It will be appreciated that this metalizing method fails with quartz because of the high temperature and time periods required.

According to this invention the problems related to the temperature limitations of quartz have been solved by the discovery that if a metallic substance is applied to the quartz in sufficiently small particle size and with a sufficiently high degree of compactness that the metalizing material can be sintered to the quartz at substantially lower temperatures than are required in connection with the particle sizes and compactness associated with the metalizing methods used in connection with ceramic.

Thus, one feature of the invention is that the substance with which the quartz is metalized is applied in extremely small particles such as in the form of atoms or molecules. When the metalizing substance is applied in this manner it is possible to sinter it to the quartz under heat and time conditions which do not cause the quartz to recrystallize.

Another reason why quartz is more difficult to metalize than ceramic is that the thermal coefficient of expansion of quartz is much less than that of ceramic. Ceramic of the type normally used in electronic tubes has a coefficient of expansion of about $60 \times 10^{-7}$, while that of quartz is only $6 \times 10^{-7}$. In fact, the expansion coefficient of quartz is so low that it cannot be matched by any metal or for that matter by any other substance. Thus, even after solving the problem of low temperature sintering the problem of expansion coefficient remains. As a result of the extremely low coefficient of expansion of quartz, any metalizing material which will form a strong bond to the quartz will tend to crack the quartz as it expands and contracts relative to the quartz under thermal shock. Closely related to the problem presented by the low coefficient of expansion of quartz is the ductility of the metal used for metalizing. Metalizing made of a non-ductile metal will exert more destructive force on the quartz under thermal shock than a ductile metal even though the coefficient of expansion of the non-ductile metal may be closer to that of quartz.

All of the metals which have been found by the application of this invention to achieve a strong vacuum-tight bond with quartz are metals which are non-ductile, that is, have high annealing temperatures. Accordingly, when such metals are bonded to quartz in any appreciable thickness the discrepancies in the coefficients of expansion will cause the metal to tear away from the quartz under the influence of the temperature changes which are associated with the metalizing procedure and in many cases the temperature changes which are associated with operation of the device in which quartz is used. However, it has been found according to the invention that if the metalizing material is applied in an extremely thin layer it is too weak to overpower the quartz, that is, the metal is in effect given an artificial ductility. By depositing the metalizing substance in the form of atoms or molecules it is possible to make the metalizing so thin that it will not be strong enough to crack the quartz and yet be of a uniform thickness such that the entire area to be metalized receives a coating to which a metal member can be joined.

After the quartz has been metalized with an extremely thin metal layer, it is necessary to have some means for joining the metalizing layer to a metal member of the device in which the quartz is to be used. It has been found according to the invention that the metalizing layer can be bonded to a relatively thick metal member without causing the quartz to crack if the relatively thick metal member is one which is extremely ductile, that is, one which has an annealing temperature substantially lower than the annealing temperature of the metalizing material.

Further, it has been found according to the invention that the bond between the metal member and the metalizing layer must not involve any substantial alloying of the metalizing layer. There are two reasons why there must not be any substantial alloying of the metalizing layer. One reason arises from the fact that the metalizing layer must be so thin; for example, a thickness of only 2000 angstroms has been found to give excellent results. Thus, no appreciable amount of the metalizing layer can be used in alloying without eating the metalizing away from the quartz and thus destroying the bond between the metalizing layer and the quartz. The other reason why there must be no substantial alloying of the metalizing layer is that in the case of some metals which are sufficiently ductile to be used as the metal member, an alloy which will bond the metal member to the metalizing layer is substantially less ductile than the pure metal of the metal member. Thus, a non-ductile interface is formed which is in effect the same as increasing the thickness of the non-ductile metalizing layer and results in cracking of the quartz.

According to the invention two solutions have been found to the problem of detrimental alloying the metalizing layer. One solution is to make the metal member of a metal which will not alloy with the metalizing layer. Heretofore it has been thought that there was no way to form a satisfactory bond directly between metals which do not alloy. However, contrary to expectations it has been found according to the invention that a strong, permanent pressure seal can be formed between such metals, for example, between molybdenum and gold. This pressure seal, as distinguished from a pressure seal between metals which alloy, does not form an alloy at the interface. The other solution is to form a braze-type bond between the metal member and the metalizing layer wherein no substantial amount of the metalizing material is used up in the brazing alloy, and the alloy is more ductile than the metalizing material.

The purpose of this invention is to bond quartz to metal with a seal which is vacuum-tight and physically strong.

Another object of the invention is to provide a method by which a layer of metal can be firmly bonded to quartz without heating the quartz to an extent which will cause recrystallization thereof.

A further object of the invention is to accomplish quartz metalizing by the application of an extremely thin uniform metal coating.

Another object of the invention is to provide a quartz-to-metal seal in which a metal member is attached to a metalizing layer on the quartz by means of a bond which does not involve any appreciable alloying of the metalizing layer.

The invention possesses other objects and features of advantage, some of which, with the foregoing, will be set forth in the following description of the invention. It is to be understood that the invention is not limited to the disclosed species, as variant embodiments thereof are contemplated and may be adopted within the scope of the claims.

Referring to the drawings:

FIGURE 1 is a side view, mainly in section, showing a klystron embodying a quartz-to-metal seal in accordance with the invention;

FIGURE 2 is an enlarged sectional view showing the details of one of the quartz-to-metal seals in FIGURE 1;

FIGURE 3 is a cross-sectional view including a schematic wiring diagram showing apparatus for applying and sintering metalizing on quartz;

FIGURE 4 is a cross section along the line 4—4 of FIGURE 3;

FIGURE 7 is an elevational view, partly in section, of apparatus which can be used to obtain a pressure seal in accordance with the invention;

FIGURE 8 is a cross-sectional view similar to FIGURE 2 showing another embodiment of the quartz-to-metal seal according to the invention; and FIGURE 9 is an enlarged sectional view of a portion of the quartz member shown in FIGURE 7 and is similar to FIGURE 2 but shows another embodiment of the quartz-to-metal seal according to the invention.

Figure 5:
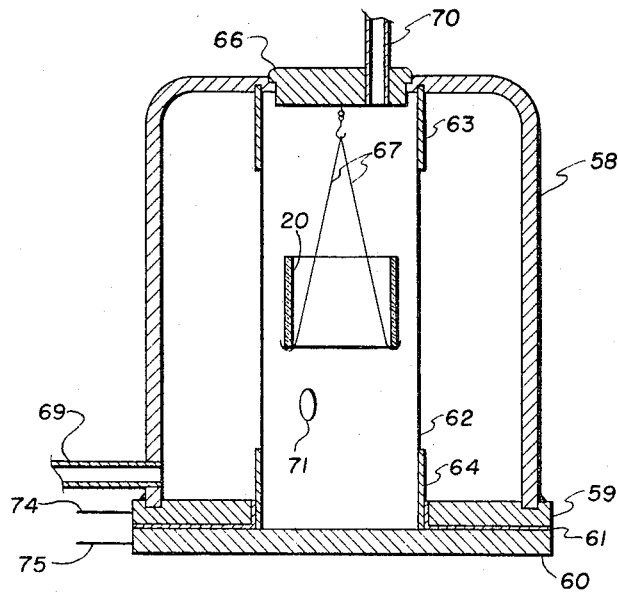
FIGURE 5 is a cross-sectional view of another embodiment of apparatus which can be used for sintering metalizing on quartz.

Referring to the drawings in more detail, FIGURE 1 shows a klystron of the type described in detail in the patent to C. E. Murdock, No. 2,824,289, dated February 18, 1958. The klystron comprises an electron gun 11 which projects an electron beam through a number of drift tubes 12, 13 and 14 into a collector 15. The electron beam as it passes through the gaps between the drift tubes reacts with cavity resonators, as explained in detail in the aforementioned Patent No. 2,824,289. The cavity resonators are made of evacuated portions 18 and external portions (not shown). The evacuated portions 18 of the cavity resonators are made of disk-shaped metal end walls 19 connected by a cylindrical window 20 of insulating material. In the past, cylindrical windows 20 have been made of glass or ceramic. The window 20 according to the invention is made of quartz. The seal between the quartz windows 20 and the metal end walls 19 are indicated generally at 22 in FIGURE 1.

FIGURE 2 is an enlarged view which represents a preferred embodiment of the quartz-to-metal seal. In FIGURE 2 an attempt has been made to give a physical conception of the sealing structure obtained in accordance with the invention. Clearly defined layers of metalizing material having visible thicknesses are shown. However, it should be understood that FIGURE 2 is for the purpose of clarification and that many of the dimensions shown therein are extremely exaggerated. As shown in the preferred embodiment of FIGURE 2, there is a layer of molybdenum 23 bonded to quartz cylinder 20. The bond between the molybdenum and quartz is enhanced by an intermediate deposit of titanium 24. The molybdenum layer is extremely thin, being on the order of 1,500 to 5,000 angstroms, and the deposit of titanium is even more minute, being in the neighborhood of only 30 to 50 angstroms. A layer 25 of gold is bonded to the molybdenum layer 23. The thickness of the gold layer is not critical because of its extreme ductility. As will be discussed further hereinafter, the titanium and gold are not absolutely necessary but are extremely desirable because they facilitate the making of a high yield strong vacuum-tight seal.

Attached to the gold layer 25 is a metal sealing ring 26 made of gold. The metal ring 26 is bonded to gold layer 25 by means of a pressure seal, as will be described in more detail hereinafter. The thickness of ring 26 is not critical but is preferably on the order of 6 thousandths of an inch. Sealing ring 26 is brazed or otherwise bonded to a second gold sealing ring 27, which is in turn brazed to the thick metal end wall 19, which is usually copper.

The arrangement thus far described provides a strong, vacuum-tight seal which can be subjected to repeated heat cycling without damage. The arrangement can be strengthened where desired, particularly in connection with large heavy structures, by the addition of a quartz backing ring 30, which is also provided with metal layers 23, 24, 25 of molybdenum, titanium and gold, respectively. The gold layer 25 of backing ring 30 is attached to sealing ring 26 by means of a pressure seal, and the surface of ring 30 which abuts the metal end wall 19 is not metalized.

As has been previously explained, one of the features of the invention resides in the manner in which metalizing is applied to the quartz. FIGURES 3 and 4 disclose apparatus for metalizing quartz according to one of the embodiments of the invention. Essentially, the apparatus comprises a vacuum-tight container 31 formed of metal end walls 32 and 33 connected by a cylindrical side wall having a lower metal portion 34 and an upper window portion 35 of transparent material such as glass. Sealing rings 36 are provided at the joints between various walls of the container. A rotatable shaft 37 is carried by the end wall 32 and is provided externally of the container with means (not shown) for rotating it during the metalizing process. The upper end of the shaft 37 is provided with suitable means for supporting quartz cylinder 20. For example, the upper end of shaft 37 can have pivotally attached thereto three arms 38 which are notched to receive the end of cylinder 20 and are biased upwardly by spring 39 toward the axis of the shaft.

As previously explained, the invention requires that metalizing be deposited on the quartz in the form of extremely small particles. This is accomplished in the apparatus of FIGURE 3 by vaporing or subliming the metalizing material and allowing it to condense on the quartz. To this end six insulating plugs 40 are mounted in end wall 33. The two plugs 40 at the left of FIGURE 3 carry an inverted U-shaped tungsten wire 41. The bend of the wire 41 is positioned within the container adjacent the end of cylinder 20 and carries a small bead 42 of titanium. In addition, a short length of molybdenum wire 43 is wrapped around the bend in wire 41. In order to prevent the molybdenum wire 43 from running together and beading on the wire 41 when the molybdenum is heated high enough to vaporize, it is desirable to place a short coil of tungsten wire (not shown) on the tungsten wire 41 along with the coil of molybdenum 43 so that the turns of the molybdenum coil alternate with those of the tungsten coil.

A second U-shaped tungsten wire 45 passes through plugs 40 on the right of FIGURE 3 and carries on its bend a coil of gold wire 46. A heater coil 48 is positioned within cylinder 20 with its leads passing through the two plugs 40 at the center of FIGURE 3. Suitable means are provided for passing current through wires 41, 45 and 48. For example, the leads for heater coil 48 can be connected to a 110-volt A.C. source through an adjustable auto-transformer 50, and wires 41 and 45 can be connected to a 110-volt A.C. source through an auto-transformer 51, a fixed transformer 52 and a switch 53. End plate 32 is connected by means of tubulation 55 to a conventional vacuum system.

Describing the operation of the apparatus shown in FIGURES 3 and 4, the cylinder 20 to be metalized is placed in container 31 as shown in FIGURE 3. In order to obtain metalization only on the end of cylinder 20 the inside and outside of the cylinder are coated with a removable protective substance such as "Aquadac." The vacuum system (not shown) is turned on and container 31 is evacuated. Rotation of shaft 37 is started and then current is passed through the heater 48, utilizing the adjustable transformer 50 to bring the temperature of the quartz cylinder 20 up to about 800 to 900° C. It should be remembered that the quartz must not be heated over 1,000° C. for any appreciable length of time. Next, the wire 41 is heated, and in order to accomplish this it will be noted that switch 53 occupies the position shown in FIGURE 3. Transformer 51 is adjusted so that the titanium bead 42 is heated to a high enough temperature to vaporize it. As previously stated, only a very minute deposit of the titanium is necessary, and a thick deposit could not be tolerated. A deposit of around 30 to 50 angstroms has been found to be satisfactory. Next, the transformer 51 is adjusted to increase the current flow and raise the temperature of the molybdenum coil 43 so that is vaporizes and condenses on the previously deposited titanium layer.

After the molybdenum layer has been deposited, the transformer 50 is readjusted to allow the quartz cylinder 20 to cool down to about 500 to 600° C. After this has been accomplished, the switch 53 in FIGURE 3 is moved to the right to connect wire 45 to transformer 51 which is readjusted to heat the gold coil 46 to vaporize it. The main purpose in applying the gold layer 25 is to provide a protective coating on the molybdenum layer 23 so that it is not necessary to provide special handling of the metalized quartz during further processing to prevent oxidation of the molybdenum layer.

Although the combination of metals thus far described is preferred, other metals of similar critical characteristics can be substituted. For example, the titanium primer layer can be replaced by chromium, zirconium, columbium, tantalum, or molybdenum disilicide. Similarly, the molybdenum can be replaced by tantalum, zirconium, columbium or titanium. It should be understood that when the molybdenum is replaced by the listed substitutes, there is little or no need for a separate primer layer. As a matter of fact, molybdenum as well as all of the listed substitutes can be deposited directly on the quartz without a primer layer. However, a higher yield of perfect seals is found to result from the use of a primer layer when molybdenum is used as the main layer. In addition, silver can be substituted for gold as the protective layer or coating 25. However, if silver is used, the sealing ring 26 must be silver or copper instead of gold because silver and gold form a non-ductile alloy.

FIGURE 5 shows another embodiment of apparatus for sintering the metalizing layer on the quartz member 20. This apparatus comprises a metal container 58 having a permanently attached end ring 59 and a removable end plate 60 separated therefrom by a sealing gasket 61. Plate 60 carries a cylinder 62 of very thin reflective metal such as nickel, reinforced at top and bottom by thicker metal sleeves 63 and 64. A removable closure 66 fits in the top of container 58 and carries three lengths of wire 67 which support the previously metalized quartz cylinder 20. Suitable tubulation 69 and 70 is provided in container 58 and closure 66, respectively, and a communication port 71 is provided in cylinder 62. Cylinder 62 serves as the heater for the apparatus, and current is conducted to the cylinder by leads 74 and 75.

In order to utilize the apparatus of FIGURE 5, a layer of molybdenum or one of the listed substitute metals is first deposited by means of apparatus similar to that shown in FIGURE 3, except that it can be simplified by elimination of wires 45, 46, 48 and the associated insulators and circuitry. It will be understood that according to this embodiment the quartz is not heated by the coil 48 during deposition of the metalizing, and the metalizing is not coated with gold. After the metalizing has been deposited by the described modified apparatus of FIGURE 3, the quartz member is placed in the apparatus of FIGURE 5 and heated to a temperature of about 1,300°C. for about 3 minutes to sinter the metalizing. It should be noted that this is about the maximum time and temperature combination which the quartz can withstand. It is necessary to provide a protective atmosphere in container 58 throughout the heating operation, and this is accomplished by evacuating the container or by circulating a gas such as hydrogen by means of tubulation 69 and 70.

Figure 6:
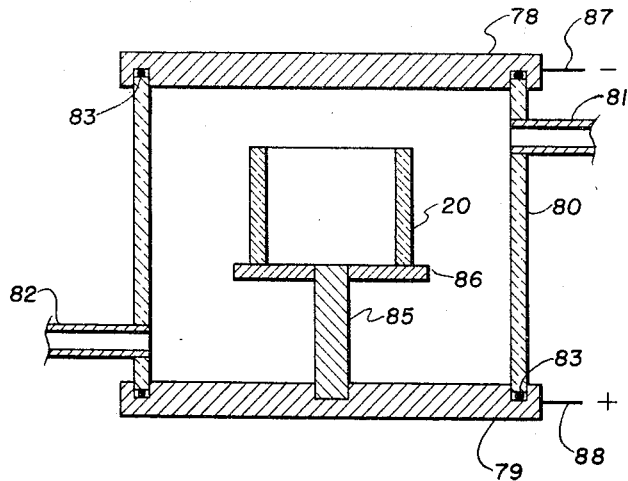
FIGURE 6 is a cross-sectional view of another embodiment of apparatus which can be used for metalizing quartz.

Still another embodiment of metalizing apparatus is shown in FIGURE 6 which comprises a container having metal end walls 78 and 79, and a side wall 80 of insulating material. Side wall 80 carries tubulation 81 and 82 and is separated from end walls 78 and 79 by means of sealing rings 83. A metal post 85 carrying a circular disc 86 serves as a support for the quartz cylinder 20 which is to be metalized. The upper end wall 78 is made of molybdenum or one of the mentioned substitute metalizing materials.

The procedure for using the apparatus of FIGURE 6 is to employ the process known in the art as "cathode sputtering" to cause particles to be knocked off of end wall 78 and deposited on the end of quartz cylinder 20. In order to use the cathode sputtering principle with this apparatus, a gas such as mercury or krypton is introduced into the container by means of tubulation 81 and 82. End wall 78 is connected by means of lead 87 to an appropriate source of negative D.C. voltage, for example, 300 to 1500 volts, and end wall 79 is connected by means of lead 88 to the positive side of the voltage source. This voltage causes the gas to ionize and form a plasma. The positively charged particles in the plasma bombard the end wall 78 knocking off particles which deposit on the quartz cylinder 20. Although not absolutely necessary, it is desirable to place a small negative D.C. potential on the quartz cylinder, for example, 50 to 100 volts relative to the plasma. This can be accomplished by coating the quartz adjacent its upper end with a removable conductive coating such as "Aquadac" and connecting a lead (not shown) from the "Aquadac" to an appropriate D.C. power source. Metalizing applied by the apparatus of FIGURE 6 strikes the end of the quartz with such force that no additional heating is necessary to accomplish sintering.

After the quartz cylinder 20 has been metalized by one of the methods and apparatus thus far described, it is necessary to attach a metal sealing ring to the metalizing. The preferred means of attaching the sealing ring is by a pressure seal. Apparatus for accomplishing the pressure seal is shown in FIGURE 7 and comprises a base plate 90 which carries a conventional hydraulic ram having a cylinder 91 and a piston rod 92. The usual hydraulic lines 93 and 94 are connected to cylinder 91. The upper end of piston rod 92 carries a clamping head 95 on which the metalized quartz cylinder 20 is placed. A second clamping head 96 rests on top of the quartz cylinder 20 and has pivotally attached to the under side thereof three tension rods 97 which have enlarged heads 98. Clamping head 95 is provided with three holes 95' which accommodate rods 97 and are sufficiently large to permit passage of heads 98. Base plate 90 has three radial slots 99 in which the rods 97 are removably received. A removable oven 100 surrounds the cylinder 20 and comprises an inverted metal cup 101 surrounded by a heating coil 102 and insulating material 103. Suitable inlet and exhaust tubes 104 and 105 are connected to cup 101.

As previously mentioned in connection with FIGURE 2, the sealing rings 26 are preferably made of gold. In order to make a pressure seal between the gold sealing rings and the metalized quartz cylinder 20, the heating coil 102 is energized to bring the quartz cylinder 20 to about 600 to 800°C., and then the hydraulic ram is operated to force piston rod 92 and clamping head 95 upwardly. Clamping head 96 is held stationary by tension rods 97, and as a result both the sealing rings 26 are pressed against the metalized ends of cylinder 20. A pressure of around 2000 p.s.i. exerted for about 10 minutes has been found satisfactory. It should be understood that other combinations of time, temperature and pressure will work. For example, if the pressure is increased, the time can be decreased.

It will be recalled that the preferred metalizing arrangement includes a final coating of gold, and when this is done it is not necessary to provide a protective atmosphere in oven 100. When the metalizing does not include the final coating of gold, a protective atmosphere such as hydrogen is maintained in the oven by means of tubes 104 and 105. After the pressure seal has been made, the oven 100 is lifted off and the hydraulic ram is vented to remove the pressure from the piston rod 92. Then rods 97 are moved radially outward so that heads 98 are removed from base plate 90. Then clamping head 96 is lifted, pulling rods 97 through holes 95' and out of cylinder 20 so that the cylinder can be removed.

Although a pressure type seal is preferred for attaching the sealing ring 26 to the metalized quartz, a braze type seal of more limited capabilities can be made if certain precautions are taken. In particular, it is necessary that no substantial amount of the metalizing material is used up in the brazing alloy and that the brazing alloy is substantially more ductile than the metalizing material. For example, a satisfactory braze type seal, as shown in FIGURE 8, can be made by coating the layer 23 of molybdenum, or one of the listed substitute metalizing materials, with a wetting substance, such as nickel 107 deposited in a galvanic bath. The nickel coating 107 should be even thinner than the metalizing material to avoid building up substantial thickness of non-ductile material and to make certain that no appreciable amount of metalizing material is used in alloy with the nickel.

Next, a silver or copper-silver brazing ring is placed against the nickel coating, and a sealing ring 26' made of copper is pressed against the brazing ring. Finally, the seal is heated to brazing temperature to form an alloy 108. If desired, the nickel can be plated with silver instead of using a separate brazing ring. In any event, the brazing material should be no thicker than necessary to form a satisfactory bond because the thicker the brazing material is, the thicker will be the alloy layer, which is less ductile than the pure metal of sealing ring 26'. It should be understood that the silver and copper substantially do not alloy with the molybdenum, and therefore there is no danger of using up the metalizing in alloy. The fact that siver and copper do not alloy with molybdenum is the reason why the nickel coating is used, and as previously mentioned, the nickel coating is so thin that it cannot take an appreciable amount of molybdenum into alloy. If it were desirable to use a silver sealing ring, then copper would be used as the brazing material.

FIGURE 9 is an enlarged view of a portion of a quartz cylinder 20 showing the simplest version of a seal made in accordance with the invention. In FIGURE 9 the metalizing material consists entirely of a single layer 23 of molybdenum or one of the listed substitute metals to which a sealing ring 26 of gold, silver or copper has been pressure sealed in the apparatus of FIGURE 7.

As stated previously, the coefficient of expansion of metals is much greater than quartz. Therefore, if a quartz-to-metal seal is placed in a polaroid stress analyzer, lines of stress are observed in the quartz caused by the uneven thermal expansion, even though a high ductile metal is used. This stress is not large, and under ordinary conditions will not be objectionable.

It was observed in the same analyzer that the thermal stresses are less if the ends of the quartz tube, which are to be sealed to the metal, are slightly double-chamfered or beveled to form a slight ridge disposed centrally from the inner and outer cyindrical surfaces. The amount of bevel to be used depends on the size of the quartz to be sealed and is readily determined by one skilled in the art. The angle of the bevel is usually between one and two degrees.

I claim:

1. A quartz-to-metal seal comprising a quartz member, a molybdenum metalizing layer bonded to the quartz, and a metal member substantially thicker than the metalizing layer bonded to the metalizing layer, said metal member being selected from the group consisting of copper and silver, and said bond between the metal member and the metalizing layer comprising copper-silver eutectic.

2. A quartz-to-metal seal as claimed in claim 1 in which said bond between the metal member and the metalizing layer further comprises a layer of nickel on said metalizing layer, said nickel layer being thinner than said metalizing layer.

3. A quartz-to-metal seal comprising a quartz member, a molybdenum metalizing layer no thicker than about 5,000 angstroms bonded to the quartz, a layer of nickel on the molybdenum and thinner than the molybdenum layer, and a metal member substantially thicker than the molybdenum layer bonded to the nickel layer, said metal member being selected from the group consisting of copper and silver, and said bond between the metal member and the metalizing layer comprising copper-silver eutectic.

4. A metalized insulator comprising a dielectric member made of quartz in the non-crystalline state, a primer coating on the quartz, said primer coating being of a substance selected from the group consisting of titanium, chromium, zirconium, columbium, tantalum, and molybdenum disilicide, a coating of molybdenum over said primer coating, and a coating of a wetting metal on said molybdenum coating.

5. A metalized insulator as claimed in claim 4 in combination with a metal member selected from the group consisting of copper and silver, and a copper-silver eutectic braze bonding said metal member to said wetting metal.

6. A quartz-to-metal seal comprising a dielectric member made of quartz in an non-crystalline state, metalizing material on said quartz member, said metalizing material comprising primarily a metal selected from the group consisting of molybdenum, tantalum, zirconium, columbium and titanium, and a metal member bonded to said metalizing material, said metalizing material having a thickness no greater than about 5,000 angstroms, and said bond between the metal member and the metalizing material comprising a copper-silver eutectic braze.

7. A metalized insulator comprising a dielectric member made of quartz in an non-crystalline state, and a metalizing material on said quartz member, said metalizing material having a thickness of about 1,500 to 5,000 angstrons, said metalizing material consisting essentially of a metal selected from the group consisting of molybdenum, tantalum, zirconium, columbium and titanium, and a coating of a wetting material over said metalizing material.

8. A quartz-to-metal seal comprising a quartz member, a molybdenum metalizing layer on the quartz, a wetting coating of nickel directly on the molybdenum, and a sealing member bonded to the nickel coating with a copper-silver brazing alloy, said sealing member being selected from the group consisting of copper and silver.

9. A metalized insulator comprising a dielectric member made of quartz in an no-crystalline state, and a metalizing material on said quartz member, said metalizing material having a thickness of about 1,500 to 5,000 angstroms, and a coating of a wetting material over said metalizing material.

References Cited by the Examiner
UNITED STATES PATENTS

| | | | |
|---|---|---|---|
| 2,996,401 | 8/1961 | Welch | 29—473.1 X |
| 3,115,957 | 12/1963 | Heil | 287—189.365 |

RICHARD W. COOKE, Jr., *Primary Examiner.*

UNITED STATES PATENT OFFICE
CERTIFICATE OF CORRECTION

Patent No. 3,281,174                                       October 25, 1966

Oskar Heil

It is hereby certified that error appears in the above numbered patent requiring correction and that the said Letters Patent should read as corrected below.

Column 3, line 9, after "alloying" insert -- of --; column 5, line 7, for "vaporing" read -- vaporizing --; column 10, line 8, for "no-crystalline" read -- non-crystalline --.

Signed and sealed this 28th day of November 1967.

(SEAL)
Attest:

Edward M. Fletcher, Jr.
Attesting Officer

EDWARD J. BRENNER
Commissioner of Patents